April 28, 1970 T. B. WRIGHT 3,508,306

SHIFTABLE ROTARY OPERATIVE PANEL FASTENER

Filed July 24, 1968

INVENTOR
THOMAS B. WRIGHT
BY
James R. O'Connor
ATTORNEY though 3,508,306
SHIFTABLE ROTARY OPERATIVE
PANEL FASTENER
Thomas B. Wright, Diamond Bar, Calif., assignor to United-Carr Incorporated, Boston, Mass., a corporation of Delaware
Filed July 24, 1968, Ser. No. 747,247
Int. Cl. A44b 17/00
U.S. Cl. 24—221    8 Claims

ABSTRACT OF THE DISCLOSURE

A socket assembly of a rotary operative stud and socket panel fastener combination includes an apertured base plate which is fastened to an apertured support to which the panel is to be secured and a stud locking receptacle having a stud receiving opening. Springs mounted on the socket assembly normally bias the receptacle toward a position where the opening therein is in axial registration with the apertures in the base plaet and the support. The receptacle is shiftable to a considerable extent both longitudinally and transversely of the base plate against the bias of the springs.

BACKGROUND OF THE INVENTION

Field of the invention

The invention relates to panel fasteners, in particular a shiftable socket assembly of a panel fastener combination.

Description of the prior art

The patented prior art includes a number of shiftable panel fastener sockets. In certain instances the stud locking receptacle is loosely retained in the mounting base plate to allow for extensive shifting, but by reason of the loose assembly is subject to lost motion turning responsive to rotation of the stud to its locking position. Further, it is highly desirable that the attitude of the slot in the locking receptacles which receive the radial arms of the studs be consistent in a series of fasteners to assist a workman who is operating "blindly" in orienting the studs with the sockets at the time the couplings are effected. Thus any accidental spinning or rotating of the locking receptacles is extremely disadvantageous.

To prevent deliberate or accidental rotation of the receptacles, many other known sockets feature tighter fitting receptacle retainers but the latter limit the extent to which the receptacle and stud will shift or float. In still other known assemblies the size of the opening in the base plate or receptacle retainer has been greatly enlarged to permit shifting or floating of the stud but a substantial loss of bearing area beneath the receptacle has resulted.

The present invention was designed responsive to a request from a major manufacturer of carrier based naval aircraft who had encountered problems with the fasteners securing an access door located adjacent the intersection of the wing and fuselage of a particular model. Dynamic drop tests simulating carrier landings had indicated that the fasteners formerly employed to secure the door were failing to shear due to extreme flexing of the wings. The manufacturer subsequently specified that an acceptable fastener for the particular mounting mentioned above would have to float or shift at least .220" radially (.440" overall) from its axial center without any sacrifice of bearing area or holding power and would also have to be self-aligning to provide for rapid installation and removal of the door by service personnel. An additional requirement was that any fastener which satisfied the above criteria also retain the pre-existing mounting centers for the rivets which secure the sockets to the fuselage. The latter requirement in effect dictated that the receptacle be capable of shifting or floating over the rivets.

The device disclosed herein satisfies all of the requirements set forth above and after extensive testing was adopted. I am not aware of any prior art panel fastener which will shift or float to the extent of this design and float over minimally spaced mounting rivets while at the same time retaining the desirable features of self-alignment, maximum receptacle bearing area, and resistance to lost motion or accidental rotation.

SUMMARY OF THE INVENTION

A panel fastener according to the invention includes a stud having a radially extending arm and a socket assembly which is attached to an apertured support and is adapted to interlock with the stud responsive to rotation of the latter. The socket assembly includes a base plate fastened to the support and having an opening in registration with the support aperture, a stud locking receptacle mounted on the base plate and having a stud receiving opening, and springs mounted on the base plate which normally bias the receptacle toward a position where the stud receiving opening therein is in axial registration with the opening in the base plate. The receptacle is shiftable both longitudinally and transversely with respect to the base plate against the bias of the springs.

DESCRIPTION OF THE PREFERRED EMBODIMENT

Figure 1:
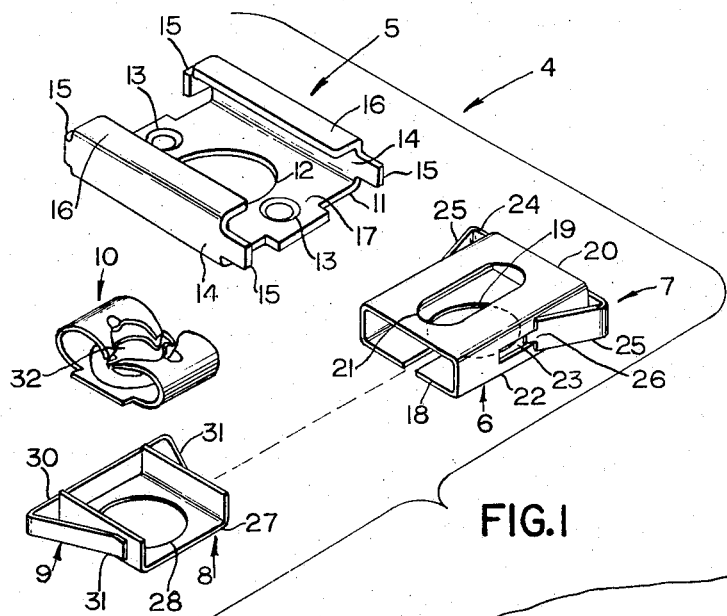
FIG. 1 is a perspective view looking on the back of the component parts of a panel fastener socket assembly according to the invention.
Figure 2:
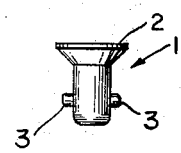
FIG. 2 is a side elevation of a typical rotatable stud which interlocks with the socket assembly.

A panel fastener combination according to the invention includes two basic component parts, namely, a rotary operative stud 1 having a pin extending through a bore adjacent the end of its shank remote from its head 2, which pin provides radially extending arms 3; and a socket assembly 4.

The socket assembly 4 includes a base plate 5; a slide retainer 6; a longitudinal spring 7; a slide 8; a transverse spring 9; and a stud locking receptacle 10, all of which parts are sheet steel stampings that are usually cadmium plated.

The base plate 5 has a flat front wall 11 having a central circular opening 12 formed therein and spaced, countersunk openings 13 lying outwardly of the circumference of the opening 12, opposed upstanding side walls 14 extending rearwardly from the front wall 11, a pair of lugs 15 connected to the opposite ends of the side walls 14, and a pair of rear flanges 16 extending inwardly from the side walls and overlying a portion of the front wall and cooperating with the front wall, side walls and lugs to define an initially one end open channel 17.

The slide retainer 6 has an open ended, rectangular, boxlike configuration, the length of which is approximately equal to the width of the channel 17 in the base plate 4.

The front wall 18 of the retainer has an enlarged, centrally located, generally elliptical opening 19 formed therein, its rear wall 20 has a narrower, elongated, generally oblong slot 21 formed therein, and its side walls 22 have narrow rectangular slots 23 extending over a portion of the length thereof.

The longitudinal spring 7 is snapped over the slide retainer 6 such that its back portion 24 lies flush against one end of the retainer and its opposed, inwardly converging spring arms 25 resiliently bear against the side walls 22 of the retainer. The tabs 26 which extend from the free ends of the spring arms 25 are slidably seated in the slots 23 in the retainer.

The slide 8 has a four-sided, boxlike configuration and its front wall 27 has a centrally disposed circular opening 28 formed therein. The slide is considerably shorter than the slide retainer but its width approximates the internal width of the retainer.

Transverse spring 9 is snapped over the slide 8 with its back portion 30 nested against the closed side of the slide and its inwardly converging spring arms 31 resiliently bearing against the opposite ends of the slide.

The stud locking receptacle 10 which has a central stud receiving through opening 32 is the well-known cam locking and releasing type of cowling fastener marketed by the Cinch-Monadnock Division of United-Car Incorporated under the registered trademark "Airloc" fasteners and its design and manner of interlocking with the stud 1 will be well known to those skilled in the fastener arts. The receptacle is also very similar to that disclosed in U.S. Patent 2,322,614 (W. A. Bedford, Jr.) and reference can be had to that disclosure for further structural and functional details.

Figures 3, 4:
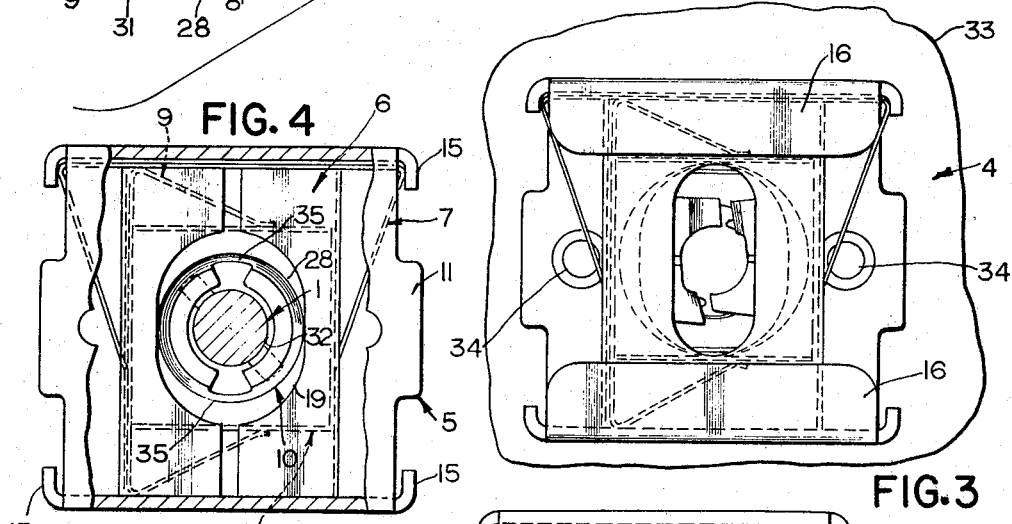
FIG. 3 is a bottom plan view of the socket assembly looking from the rear of a supporting structure to which it is riveted.
FIG. 4 is a top plan view of the interlocked stud and socket assembly depicting the stud and locking receptacle axially centered, with portions of the socket assembly being broken away and the stud being shown in cross section.

As depicted diagrammatically in FIG. 1, the parts of the socket are assembled as follows: the receptacle 10 is placed in the slide 8. The subassembly of receptacle 10, slide 8 and transverse spring 9 is then inserted into one end of the slide retainer 6 and that subassembly including longitudinal spring 7 is subsequently inserted into the channel 17 in the base plate 5 through the opened end of the channel. Thereafter, the lugs 15 adjacent the open end of the channel 17 are bent inwardly to the position depicted in FIGS. 4 through 6 to maintain the parts in assembly.

In a typical installation the socket assembly 4 is fastened to a support structure 33 (FIG. 3), for example, to the surface of the fuselage of an aircraft, by rivets, the heads 34 of which lie in the countersunk recesses 13 flush with the front wall 11 of the base place 5. The support structure 33 has an aperture formed therein with which the opening 12 in the base plate axially registers and, as the reader will observe in FIGS. 3 and 4, the springs 7 and 9 normally bias the remaining parts of the assembly into a position where the opening 32 in the receptacle 10 is in axial registration with the opening 19 in the slide retainer and the opening 12 in the base plate. The stud 1 is secured permanently in an aperture in the panel to be fastened, for example, an aircraft inspection plate, fairing plate, access door, etc., by the cross pin forming the radial arms 3, which pin is inserted into the shank of the stud after passage of the latter through the aperture in the panel. The panel is then placed against the external surface of the structure 33 (the remote surface as viewed in FIG. 3) and the stud is passed through the aligned openings in the support structure and the base plate 5 and pressed into the opening 32 in the receptacle 10 (the radial arms 3 passing into the slots 35 which communicate with the opening 32) and rotated a fractional turn to the locked position depicted in FIG. 4. Since the external dimensions of the receptacle 10 approximate the internal dimensions of the slide 8, the external width of the slide approximates the internal width of the slide retainer 6 and the length of the retainer approximates the width of the cavity 17 in the base plate 5, the reader will appreciate that the receptacle 10 is securely held against rotation, either accidental, or deliberate responsive to rotation of the stud 1. The springs 7 and 9 maintain the openings in the respective parts of the socket assembly in axial registration with the opening in the support structure 33 so that all tool receiving slots in the studs 1 can be positioned parallel to the slots 35 in the receptacles to effect rapid location of the proper insertion attitudes for the studs.

Figure 5:
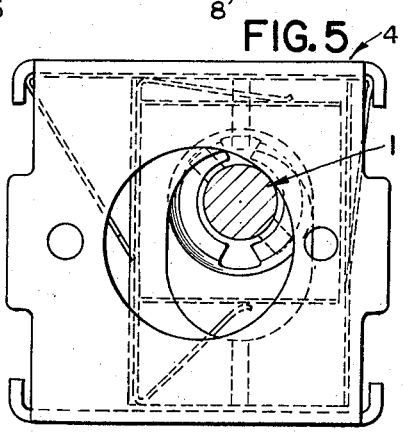
FIGS. 5 and 6 are views similar to FIG. 3 depicting the stud and locking receptacle shifted radially to the maximum extent permissible in opposite directions.
Figure 6:
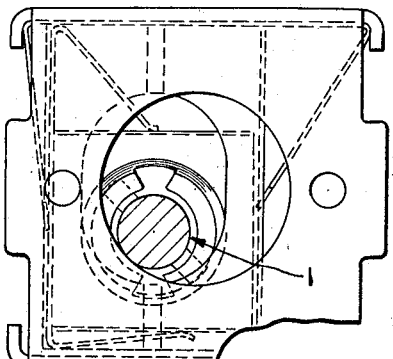

From a consideration of FIGS. 5 and 6, the reader will observe that planar stress imparted to the panel, for example, by vertical flexing of the adjacent wing of an aircraft upon landing, is relieved by the ability of the stud and receptacle to float radially to a considerable extent with respect to the openings in the support structure 33 and the base plate 5. The slide retainer 6 floats longitudinally over the rivet heads 34 (left to right as viewed in the drawings) with respect to the base plate 5 and the slide 8 floats transversely with respect to the base plate (longitudinally with respect to the slide retainer) against the bias of springs 7 and 9, respectively. The possibility of planar shifting of the panel causing the fastener components to fail in shear is therefore substantially eliminated. When the stress on the panel is removed, the springs bias the panel and the fastener components back to the axially aligned condition depicted in FIG. 4 to provide for easy release and relocking of the studs without damage to the fastener components or the panel.

Since the stud floats left to right (longitudinally) along with the slide retainer and transversely of the base plate along with the slide, the width of the slot 21 in the slide retainer is held to a minimum and the retainer thus provides extensive, safe bearing area beneath the underside or back of the receptacle 10.

I claim:

1. A rotary operative fastener combination including a stud having a radially extending arm and a socket assembly attached to an apertured support and adapted to interlock with the stud responsive to rotation of the latter, said socket assembly comprising a base plate fastened to the support and having an opening in registration with the aperture in the support, a stud locking receptacle mounted on said base plate and having a stud receiving opening, and means mounted on said base plate which normally bias said receptacle toward a position where said stud receiving opening is in axial registration with the opening in said base plate and the aperture in the support, said receptacle being shiftable both longitudinally and transversely with respect to said base plate against the bias of said means.

2. A rotary operative fastener combination including a stud having a radially extending arm and a socket assembly attached to an apertured support and adapted to interlock with the stud responsive to rotation of the latter, said socket assembly comprising a base plate fastened to the support and having an opening in registration with the aperture in the support, an apertured slide retainer mounted on said base plate, an apertured slide mounted on said slide retainer, and a stud locking receptacle mounted on said slide and having a stud receiving opening in registration with the aperture in said slide, said slide retainer being shiftable, to a considerable extent in given opposite directions, with respect to said base plate, said slide being shiftable, to a considerable extent in given opposite directions with respect to said slide retainer transversely of the aforementioned direction of movement of said slide retainer.

3. A rotary operative fastener combination including a stud having a radially extending arm and a socket assembly attached to an apertured support and adapted to interlock wtih the stud responsive to rotation of the latter, said socket assembly comprising a base plate fastened to the support and having an opening in registration with the aperture in the support, an apertured slide retainer mounted on said base plate, an apertured slide mounted on said slide retainer, a stud locking receptacle mounted on said slide and having a stud receiving opening in axial registration with the aperture in said slide, means mounted on said base plate and acting on said slide retainer which normally bias said retainer toward a position where the aperture therein axially registers with the opening in said base plate, said slide retainer being shiftable, to a considerable extent in given opposite directions with respect to said base plate against the bias of said means, and means mounted on said slide retainer and acting on said slide to normally bias the latter toward a position where the aperture therein axially registers with the aperture in said retainer, said slide being shiftable, to a considerable extent in given opposite directions transverse to the aforesaid directions of movement of said slide retainer, with respect to said slide retainer and said base plate against the bias of said last-mentioned means.

4. A rotary operative fastener combination according to claim 3 wherein said slide retainer is shiftable over the fastenings securing said base plate to the support.

5. A rotary operative fastener combination according to claim 3 wherein said slide retainer in shiftable longitudinally with respect to said base plate and said slide is shiftable longitudinally with respect to said slide retainer and transversely with respect to said base plate.

6. A rotary operative fastener combination according to claim 3 wherein said means acting on said slide retainer is a leaf spring having a back portion fixedly seated on said base plate and a pair of converging spring arms extending from said back portion and resiliently bearing against opposite sides of said slide retainer.

7. A rotary operative fastener combination according to claim 6 wherein said means acting on said slide is a leaf spring having a back portion fixedly sealed on said slide retainer and opposed converging spring arms resiliently bearing against opposite sides of said slide, said back portion lying generally normal to the said back portion of said leaf spring acting on said slide retainer.

8. A rotary operative fastener combination according to claim 3 including means which cooperatively prevent any rotation of said receptacle with respect to said slide, said slide with respect to said slide retainer, and said slide retainer with respect to said base plate.

References Cited

UNITED STATES PATENTS

| | | | |
|---|---|---|---|
| 2,322,614 | 6/1943 | Bedford | 24—221 |
| 2,407,815 | 9/1946 | Churchill | 24—221 |
| 2,414,272 | 1/1947 | Poupitch | 24—221 |
| 2,420,042 | 5/1947 | Johnson | 24—221 |
| 2,439,975 | 4/1948 | Jones | 24—221 |
| 2,451,808 | 10/1948 | Churchill | 24—221 |
| 2,456,559 | 12/1948 | Johnson | 24—221 |
| 2,486,411 | 11/1949 | Huelster | 24—221 |
| 2,491,451 | 12/1949 | Johnson | 24—221 |
| 2,560,519 | 7/1951 | Bedford | 24—221 |
| 2,684,515 | 7/1954 | Zahodiakin | 24—221 |

STEPHEN J. NOVOSAD, Primary Examiner